United States Patent [19]

Ookubo et al.

[11] Patent Number: 4,688,668
[45] Date of Patent: * Aug. 25, 1987

[54] TRANSFER SYSTEM FOR PLASTIC PROCESSING MACHINES

[75] Inventors: Takeshi Ookubo, Sayama; Motoatsu Shiraishi, Sakado; Akira Namiki, Tokorozawa; Ken Tazou, Hidaka, all of Japan

[73] Assignee: Honda Giken Kogyo Kabushiki Kaisha, Tokyo, Japan

[ * ] Notice: The portion of the term of this patent subsequent to Dec. 2, 2003 has been disclaimed.

[21] Appl. No.: 783,504

[22] Filed: Oct. 3, 1985

[30] Foreign Application Priority Data

Apr. 8, 1985 [JP] Japan .................................. 60-74141

[51] Int. Cl.⁴ ............................................. B65G 25/04
[52] U.S. Cl. .................................. 198/621; 198/346.3; 198/468.4; 198/468.6; 414/750; 414/752; 72/405
[58] Field of Search ................. 198/339.1, 345, 468.3, 198/468.4, 468.5, 468.6, 468.9, 620, 621, 740, 741, 346.3; 414/222, 225, 749–753; 72/405, 421

[56] References Cited

U.S. PATENT DOCUMENTS

| 3,456,814 | 7/1969 | Bautz | 198/621 |
| 4,511,029 | 4/1985 | Okawa | 198/621 |
| 4,540,084 | 9/1985 | Curti | 198/621 X |
| 4,625,540 | 12/1986 | Yamada et al. | |

Primary Examiner—Robert J. Spar
Assistant Examiner—Lyle Kimms
Attorney, Agent, or Firm—Armstrong, Nikaido, Marmelstein & Kubovcik

[57] ABSTRACT

A transfer system for moving workpieces between a plurality of processing stations in sequential order. A pair of guide rails extend in a workpiece transferring direction on opposed sides of the stations and are movable up and down by a driving mechanism. A plurality of arm carriages are movable along the guide rails and are joined to one another by longitudinally extending connecting bars. A plurality of handling arms extend laterally between opposed pairs of the carriages. All of the arm carriages are moved as a group by a carriage driving mechanism. Auxiliary guide rails can be fixed to the carriages extending in parallel with the main guide rails. The handling arms can be movable longitudinally along the auxiliary guide rails. Rack and pinion mechanisms can be mounted on the arm carriages and the handling arms and interconnected with each other so as to drive each pair of arms in opposite directions.

4 Claims, 10 Drawing Figures

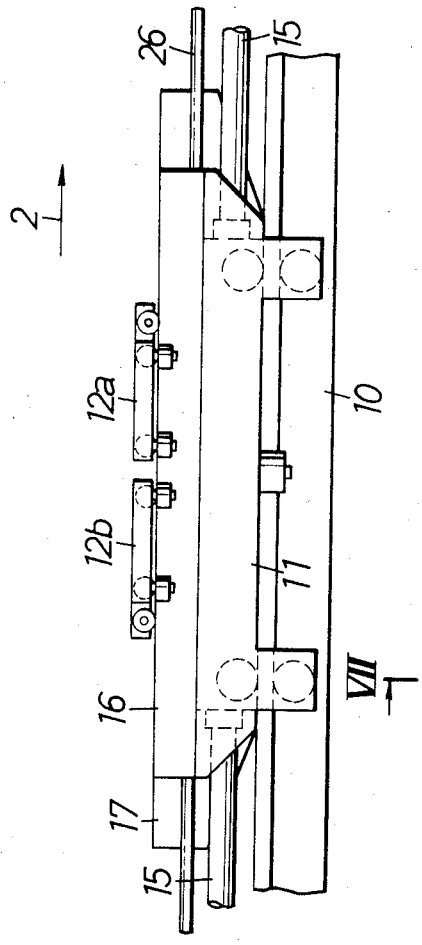
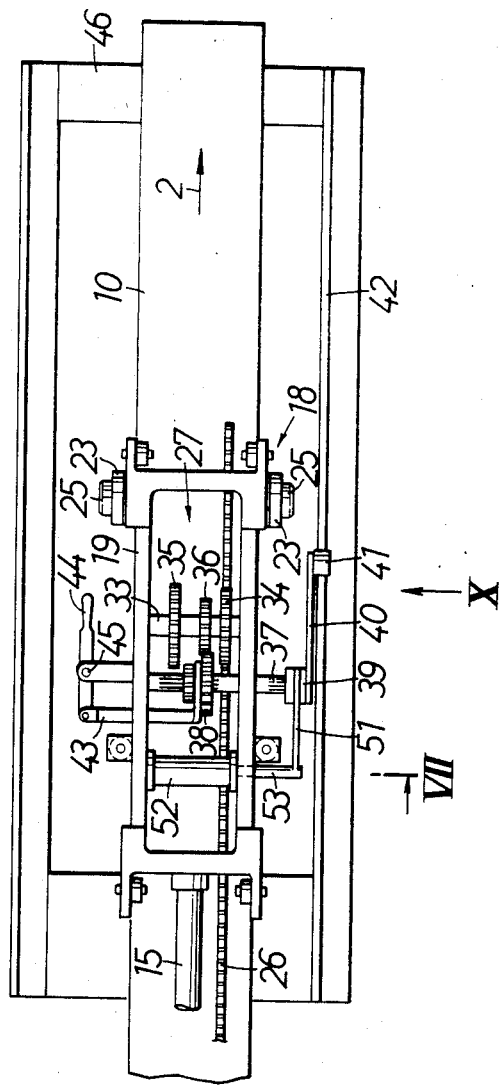
FIG.5
FIG.6

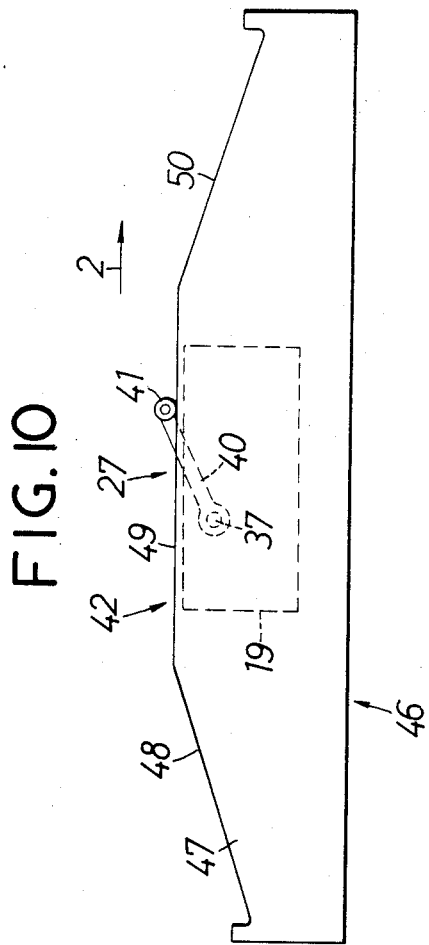

TRANSFER SYSTEM FOR PLASTIC PROCESSING MACHINES

BACKGROUND OF THE INVENTION

This invention relates to a transfer system for plastic processing machines, which is used to transfer a workpiece to a plurality of processing stations in sequential order, the stations being provided so as to be spaced in the workpiece-transferring direction in such a manner that lower and upper molds for processing the workpiece plastically in cooperation with each other can be set in each of the stations.

In a conventional transfer system of this kind, a workpiece-retainable handling arm is fixed to transfer bars provided at one or both sides of each processing station. The workpiece is transferred by utilizing a combination of the vertical and horizontal movements of the transfer bars.

However, in a prior art transfer system of this kind, the vertical and horizontal movements of a transfer bar are made by a single driving means, so that the amount of driving energy in use necessarily becomes large.

In view of the above facts, the present assignee already proposed (Japanese Patent Application No. 8097/1984) a transfer system in which the vertical and horizontal movements of a transfer bar are made by different driving means. In this proposed invention, the transfer bar as a whole is also driven, and, therefore, the transfer bar is required to be rigid. Moreover, since the dimensions of a plastic processing machine have increased, the dimensions of the driving means must also be increased. This causes an increase not only in the cost of equipment but also in the dimensions of a space in which the driving means is installed.

OBJECTS AND SUMMARY OF THE INVENTION

A first object of the present invention is to provide a transfer system for plastic processing machines, in which the above-mentioned technical problems in a formerly-proposed transfer system of this kind are solved by reducing the power used to transfer a workpiece, and miniaturizing the driving means.

In order to retain a workpiece stably, it is desirable that the workpiece be held at comparatively wide portions thereof by a handling bar. It is necessary that the handling bar be held in a waiting position between the processing stations while a workpiece is plastically processed. Accordingly, in order to miniaturize the transfer system as a whole by reducing the distance between the adjacent processing stations, it is necessary that the dimensions of a space to be occupied by the handling bar during a waiting period be reduced to as great an extent as possible.

Therefore, a second object of the present invention is to provide a transfer system for plastic processing machines, which has achieved the first object, and which is capable of holding a workpiece at comparatively wide portions thereof and operating a handling bar so that the dimensions of a space to be occupied thereby during a waiting period can be reduced to as great an extent as possible.

A first transfer system according to the present invention is provided with a pair of guide rails disposed so as to extend along the workpiece-transferring direction and at both sides of the processing stations in such a manner that the guide rails are moved up and down; a plurality of pairs of arm carriages, which are disposed so that each pair are opposed to each other on both sides of the processing stations, and which can be moved on the guide rails; a plurality of handling arms, which extend between the pairs of arm carriages each pair of which are opposed to each other with the processing stations therebetween, and which are capable of retaining the workpiece; connecting bars for joining the arm carriages on the same guide rail to one another; driving means for vertically moving the guide rails; and driving means for reciprocating the arm carriages on the guide rails.

A second transfer system according to the present invention is provided in addition to the parts of the above-mentioned first transfer system with auxiliary guide rails fixed to the arm carriages so as to extend in parallel with the workpiece-transferring direction, the plurality of handling arms being disposed so that each of the workpiece processing stations has two handling arms, each of which is adapted to be moved forward and backward on the auxiliary guide rails prior to the transferring of the workpiece; driven racks fixed to both ends of the handling arms so that the driven racks extend parallel with the workpiece-transferring direction; a pair of driving racks disposed in opposition the driven racks so that the driving racks extend through the arm carriages; and a selected number of pinions disposed between the driving and driven racks so as to drive each pair of handling arms in the opposite directions, and supported rotatably on the arm carriages, the driving racks being connected to rack driving means.

In the first transfer system according to the present invention, the arm carriages connected together, i.e., the handling arms are moved horizontally owing to the operation of the arm carriage-driving means, and the guide rails supporting the arm carriages are lifted and lowered by the guide rail-driving means. This enables the handling arms to be moved horizontally and vertically, and a workpiece to be transferred between the processing stations.

The second transfer system according to the present invention has the following operation in addition to the above-mentioned operation of the first transfer system according to the present invention. The handling arms can be moved forward and backward with respect to the arm carriages owing to the operation of the rack driving means. In order to hold a workpiece, a pair of handling arms are moved away from each other. The workpiece can then be held at comparatively wide portions thereof. During a waiting period, these handling bars are brought close to each other, so that the space occupied by the handling bars can be minimized.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 5 is an enlarged side elevation of the arm carriage;

FIG. 6 is an enlarged plan view of a driving carriage;

FIG. 10 is an illustration taken in the direction of an arrow X in FIG. 6.

DETAILED DESCRIPTION OF PREFERRED EMBODIMENTS

Figure 1:
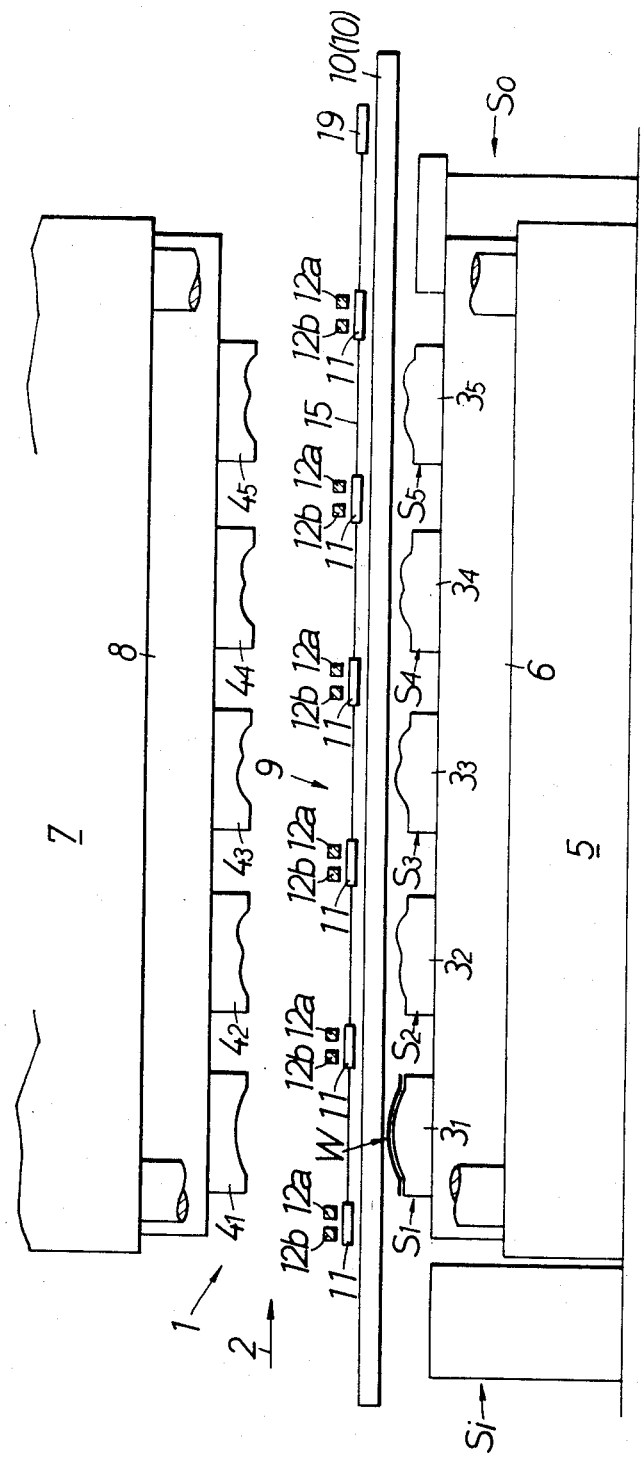
FIG. 1 is a general schematic side elevation of the present invention.

An embodiment of the present invention will now be described with reference to the drawings. First, referring to FIG. 1, in a press 1 as a plastic processing machine, a plurality of processing stations, for example, first to fifth processing stations $S_1$–$S_5$ are provided at regular intervals along a direction 2 in which a workpiece W is transferred. The processing stations $S_1$–$S_5$ are provided with lower molds $3_1$–$3_5$ and upper molds $4_1$–$4_5$ for use in cooperatively pressing a workpiece W. The lower molds $3_1$–$3_5$ are fixed to a bolster 6 on a base 5 so that the lower molds $3_1$–$3_5$ are spaced at regular intervals in the workpiece-transferring direction 2. A holder 8 fixed to a lift base 7 supports thereon the upper molds $4_1$–$4_5$ which are opposed to the lower molds $3_1$–$3_5$. A transfer system 9 is installed in this press 1. The lift base 7 is moved down to press the workpiece W between the lower and upper molds $3_1$–$3_5$, $4_1$–$4_5$. The transfer system 9 is then operated to transfer the workpiece W in the direction 2. The workpiece W is transferred from a carry-in station Si at the rear end of a path, which extends in the workpiece-transferring direction 2, to a carry-out station So at the front end thereof via the first to fifth processing stations $S_1$–$S_5$ in a stepped sequential manner by the transfer system 9 in accordance with the operation of the press 1.

The transfer system 9 has a pair of main guide rails 10, 10 disposed at opposite sides of the carry-in station Si, first to fifth processing station $S_1$–$S_5$ and the carry-out station So so as to extend in parallel to the workpiece-transferring direction; a plurality of pairs, for example, six pairs of arm carriages 11 which are movable on the main guide rails 10, 10; and a plurality of pairs of handling arms 12a, 12b each pair of which are provided so as to extend between a pair of opposed arm carriages 11, 11.

The construction of the arm carriages 11 and the construction of the handling arms 12a, 12b are basically identical with respect to the carry-in station Si, first to fifth processing stations $S_1$–$S_5$ and the carry-out station So. The construction of these parts will now be described mainly with respect to only the section of the transfer system that is in the vicinity of the fifth processing station $S_5$.

Figure 2:
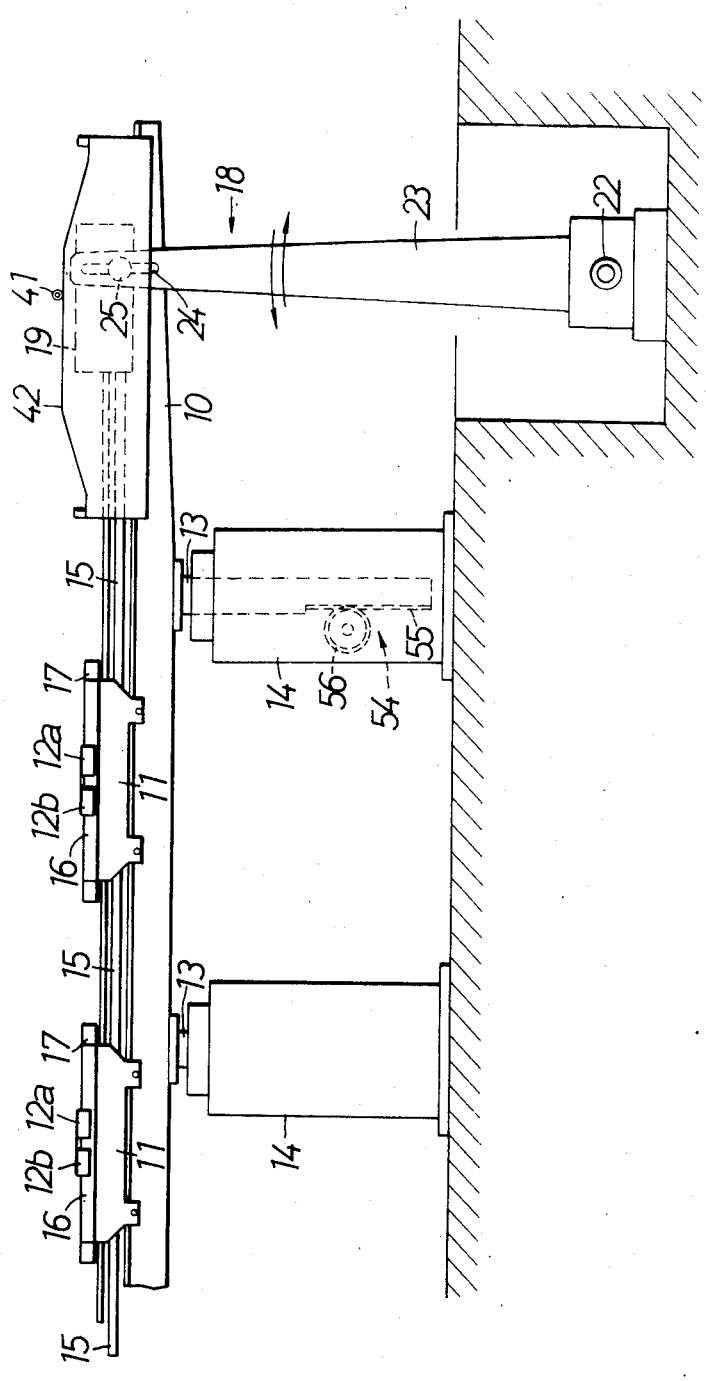
FIG. 2 is an enlarged side elevation of a principal portion of what is shown in FIG. 1.
Figure 3:
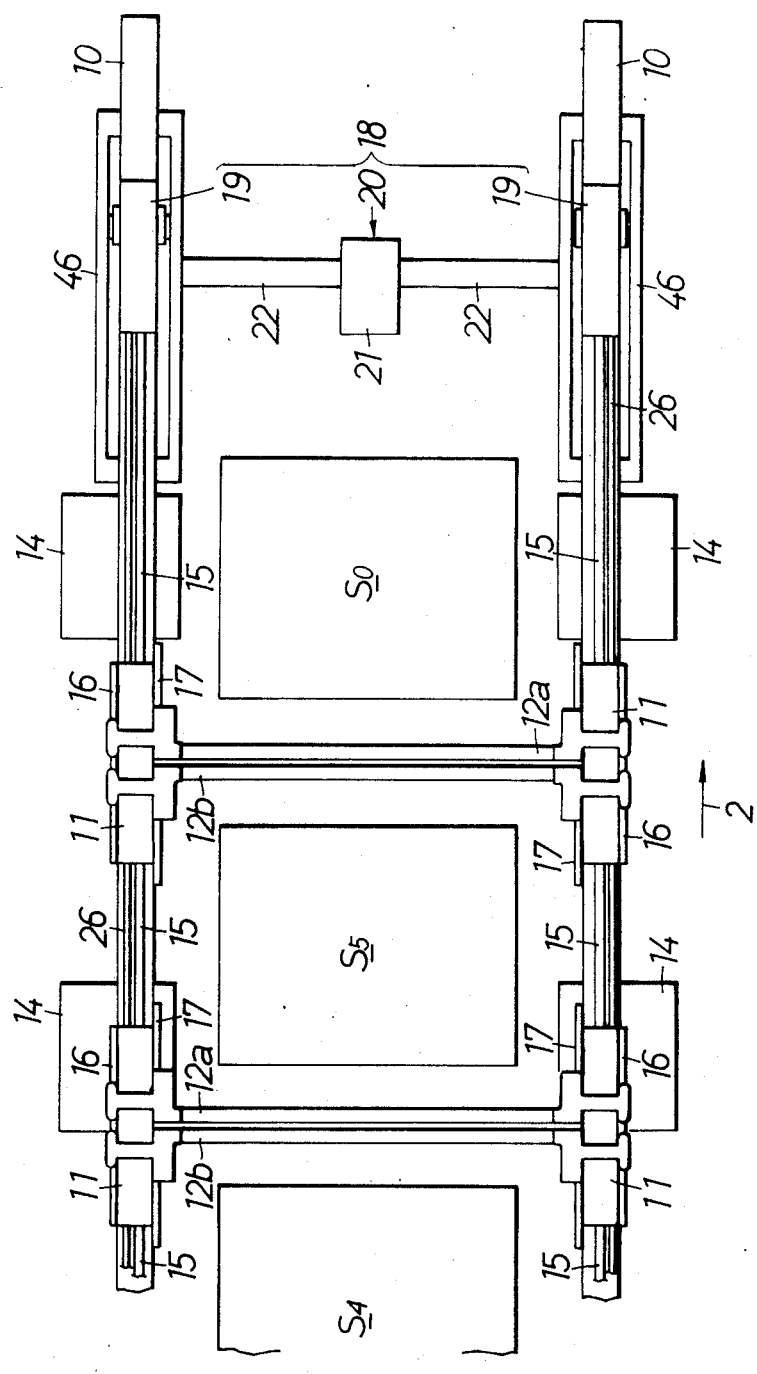
FIG. 3 is a plan view of what is shown in FIG. 2.

Referring to FIGS. 2 and 3, the main guide rails 10, 10 are disposed horizontally in parallel with each other along the workpiece-transferring direction 2. Support rods 13 extending downward are fixed to the portions of the lower surface of each of the main guide rails 10, 10 which are spaced in the lengthwise direction thereof. Each support rod 13 is supported on a support post 14 so that the support rod can be moved up and down.

The arm carriages 11, 11 are provided on the main guide rails 10, 10 in such a manner that each pair of arm carriages 11 which are adjacent to each other in the workpiece-transferring direction 2 are positioned before and after one of the first to fifth processing stations $S_1$–$S_5$, and in such a manner that the arm carriages can be moved forward and backward in the workpiece-transferring direction 2. The arm carriages 11 on the same main guide rail 10 are joined to one another by a connecting bar 15. Accordingly, the arm carriages 11 are moved together.

Figure 4:
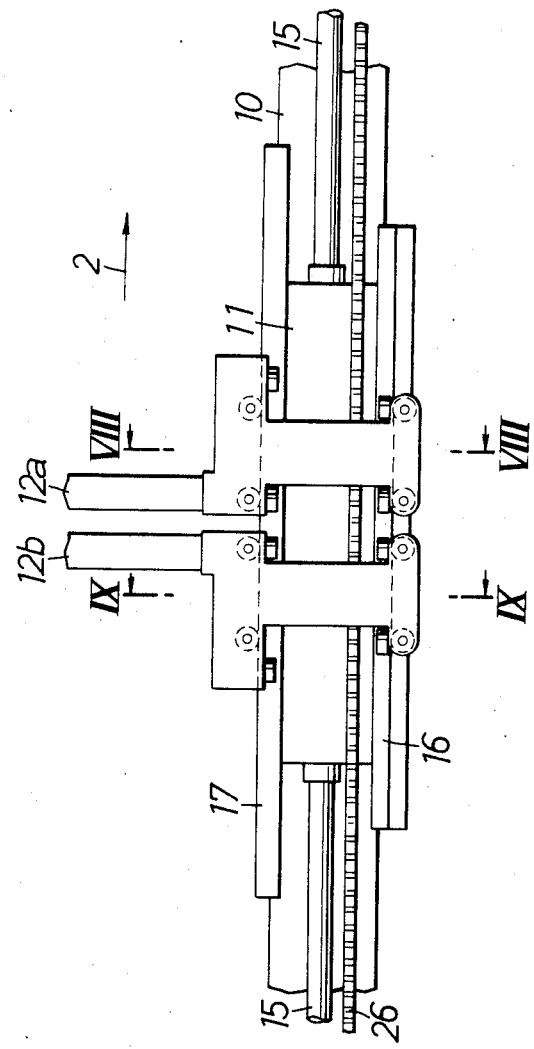
FIG. 4 is an enlarged plan view of an arm carriage.

Referring to FIGS. 4 and 5, each arm carriage 11 is provided thereon with auxiliary guide rails 16, 17 which extend in parallel with the workpiece-transferring direction 2. Handling arms 12a, 12b are provided so as to extend between a pair of arm carriages 11, 11, which are opposed with respect to the direction 2, in such a manner that the handling arms 12a, 12b can be moved on the auxiliary guide rails 16, 17. Namely, the handling arm 12a extends between the portions of the opposed arm carriages 11, 11 which are on the front side with respect to the workpiece-transferring direction 2; and the handling arm 12b extends between the portions of the same arm carriages 11, 11 which are on the rear side with respect to the same direction 2. The handling arms 12a, 12b can thus be moved relatively to each other in the forward and backward directions with respect to the arm carriages 11 in the workpiece-transferring direction 2.

Suckers (not shown) are provided on the lower portions of the handling arms 12a, 12b, and the workpiece W is held thereby.

Referring to FIGS. 2, 3, 6 and 7, an arm carriage driving means 18 used to move the arm carriages 11 on the main guide rails 10, 10 is provided with driving carriages 19, 19 capable of being moved on the portions of the main guide rails 10, 10, which are on the front side with respect to the workpiece-transferring direction 2, and a means 20 for moving the driving carriages 19, 19.

The driving carriages 19, 19 are joined on the main guide rails 10, 10 to the arm carriages 11, 11 which are close to the driving carriages 19, 19, via the connecting bars 15, 15. The driving means 20 consists of a driving power source 21, such as a motor fixed to a floor surface extending between the driving carriages 19, 19, horizontal driving shafts 22, 22 extending in the laterally opposite directions from the driving power source 21, and pivotable arms 23, 23 fixed at their base ends to the outer ends of the driving shafts 22, 22 and extending upward to be joined at the upper ends thereof to the driving carriages 19, 19. Each of the pivotable arms 23, 23 is provided in its upper end portion with a lengthwise-extending slit 24, into which a pin 25 projecting from a side portion of each of the driving carriages 19, 19 is fitted. Therefore, when the driving power source 21 is actuated to turn the pivotable arms 23, 23 to the left and right, the driving carriages 19, 19 are moved forward and backward on the main guide rails 10, 10, and also the arm carriages 11 are moved forward and backward on the same rails 10, 10 as the arm carriages 11 are drawn or pushed by the driving carriages 19, 19.

In order to move the handling arms 12a, 12b forward and backward with respect to the arm carriages 11, driving racks 26, which extend between a driving carriage 19 and arm carriages 11, is provided on each of the main guide rails 10, 10 so that the driving rack 26 can be moved in the lengthwise direction thereof. The driving rack 26 is connected at its one end with a rack driving means 27 provided on the relative driving carriage 19.

Figure 8:
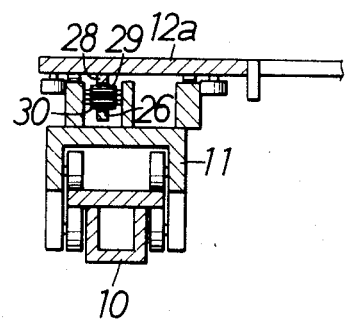
FIG. 8 is a sectional view taken along the line VIII—VIII in FIG. 4.

Referring to FIG. 8, at both end portions of the handling arm 12a, which is on the front side in the workpiece-transferring direction 2 with respect to the mate handling arm 12b, a driven rack 28 extending in the workpiece-transferring direction 2 is fixed so that the driven rack 28 is opposed to the driving rack 26. A pair of pinions 29, 30 which are meshed with each other are provided between the driven rack 28 and driving rack 26. These pinions 29, 30 are supported rotatably on the arm carriage 11. Accordingly, the driven rack 28, i.e., the handling arm 12a is moved in the same direction as the driving rack 26.

Figure 9:
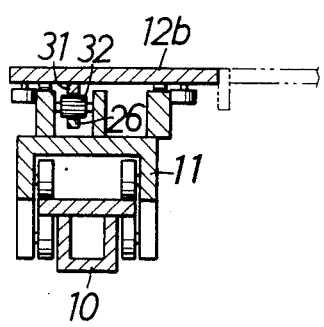
FIG. 9 is a sectional view taken along the line IX—IX in FIG. 4.

Referring to FIG. 9, at both end portions of the handling arms 12b which is on the rear side in the workpiece-transferring direction 2 with respect to the mate handling arm 12a, a driven rack 31 extending in the workpiece-transferring direction 2 is fixed so that the driven rack 31 is opposed to the driving rack 26. Moreover, a single pinion 32 supported rotatably on the arm carriage 11 is provided between the driven rack 31 and driving rack 26. Accordingly, the driven rack 31, i.e., the handling arm 12b is moved in the direction opposite to the direction in which the driving rack 26 is moved.

Figure 7:
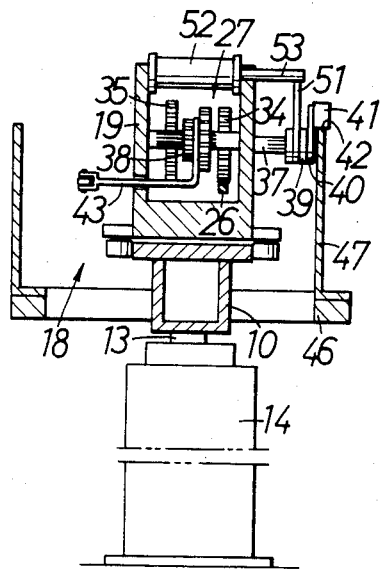
FIG. 7 is a sectional view taken along the line VII—VII in FIG. 6.

Referring to FIGS. 6, 7 and 10 as well as the figures referred to previously, the rack driving means 27 includes a horizontal rotary shaft 33 rotatably supported on the driving carriage 19, a driving pinion 34 mounted fixedly on the rotary shaft 33 and meshed with the driving rack 26, a larger-diameter gear 35 mounted fixedly on the rotary shaft 33, a smaller-diameter gear 36 mounted fixedly on the rotary shaft 33, a pivot shaft 37 extending parallel with the rotary shaft 33 and supported pivotably on the driving carriage 19, a selective gear 38, which is mounted on the pivot shaft 37 so that the gear 38 can be moved relatively in the axial direction of the shaft 37 but cannot be turned relatively therearound, and which can be selectively meshed with the larger-diameter gear 35 or smaller-diameter gear 36, a pivotable member 39 mounted on the portion of the pivot shaft 37 which projects from the driving carriage 19, in such a manner that the pivotable member 39 can be moved relatively in the axial direction of the shaft 37 but cannot be turned relatively therearound, an arm 40 extending diagonally upward from the pivotable member 39 in the forward direction parallel to the workpiece-transferring direction 2, a roller 41 as a cam follower supported rotatably at the front end of the arm 40, and a cam 42 provided on the side of the driving carriage 19 so as to be contacted by the roller 41.

The selective gear 38 is held by a first holder 43, which extends through the driving carriage 19 and is connected by a pin to an end portion of a lever 44 so that the first holder 43 can be moved in the direction parallel to the axis of the pivot shaft 37. This lever 44 is supported pivotably at its intermediate portion on the driving carriage 19 via a perpendicular shaft 45. When the lever 44 is turned, the selective gear 38 is moved in the axial direction of the pivot shaft 37 by the first holder 43. Consequently, the meshing of the selective gear 38 with the larger-diameter gear 35 or smaller-diameter gear 36 can be switched.

A support frame 46 is fixed to an end portion of each of the main guide rails 10, 10. The cam 42 is provided on the upper surface of one side plate 47 of the frame 46. Namely, the upper surface of the side plate 47 is provided with a frontwardly-rising first inclined surface portion 48, a horizontal surface portion 49 and a frontwardly-falling second inclined surface portion 50 in the mentioned order from the rear side to the front side of the path of workpiece extending in the workpiece-transferring direction 2. These first inclined surface portion 48, horizontal surface portion 49 and second inclined surface portion 50 constitute the cam 42.

The pivotable member 39 is held by a second holder 51, which is connected to a piston rod 53, the axis of which is parallel to that of the pivot shaft 37, in a cylinder 52 supported on the driving carriage 19. The pivotable member 39 is therefore, moved in the axial direction of the rotary shaft 37 by the second holder 51 in accordance with the operation of the cylinder 52. Namely, when the cylinder 52 is in an extended state, the pivotable member 39 is in a position in which the roller 42 engages with the cam 42. When the cylinder 52 is contracted, the pivotable member 39 is moved to a position in which the roller 41 retires to a position on the side of the cam 42.

The arm 40 is urged resiliently in the direction in which the roller 41 engages with the cam 42. The pivotal movement of the arm 40 for resiliently urging the roller 41 toward the cam 42 is limited by a stopper (not shown) provided on the driving carriage 19.

Each of driving means 54 for vertically moving the two main guide rails 10, 10 is provided with a rack 55 formed integrally with the relative support rod 13, and a pinion 56 meshed with the rack 55 within the support post 14, as shown in FIG. 2. When a driving power source (not shown) is started to turn the pinion 56 forward and backward, the two guide rails 10, 10 are moved up and down.

The operation of this embodiment will now be described. During a pressing operation by the lower and upper molds $3_1$–$3_5$, $4_1$–$4_5$ in the processing stations $S_1$–$S_5$, the arm carriages 11 are waiting between the carry-in station Si and first processing station $S_1$, the first and second processing stations $S_1$, $S_2$, the second and third processing stations $S_2$, $S_3$, the third and fourth processing stations $S_3$, $S_4$, the fourth and fifth processing stations $S_4$, $S_5$ and the fifth processing station $S_5$ and the carry-out station So. The roller 41 is in engagement with substantially an intermediate section of the horizontal surface portion 49 of the cam 42. During this time, the handling arms 12a, 12b are positioned in the central portion of the relative arm carriage 11.

When the pressing operations in the processing stations $S_1$–$S_5$ have been completed, the driving carriages 19 are moved back by the carriage-driving means 18 so that the arm carriages 11 are positioned substantially in the intermediate portions of the carry-in station Si and processing stations $S_1$–$S_5$. Due to the backward movement of the driving carriages 19, the roller 41 rolls from the horizontal surface portion 49 of the cam 42 to the first inclined surface portion 48. Consequently, the arm 40 is turned clockwise in FIG. 10, and the pivotal movement of this arm 40 is transmitted to the rotary shaft 33 via the pivot shaft 37, selective gear 38 and larger-diameter gear 35 or smaller-diameter gear 36, so that the rotary shaft 33 is angularly displaced in the direction opposite to the direction in which the pivot 37 is turned. Namely, the driving racks 26 are moved forward in the workpiece-transferring direction via the pinions 34.

In accordance with the forward movement of the driving racks 26, the front handling arms 12a with respect to the arm carriages 11 are moved forward, and the rear handling arms 12b are moved back. Accordingly, when the arm carriages 11 are moved back to predetermined positions, the handling arms 12a, 12b are spaced from each other. When the guide rail driving means 54 are then operated to lower the guide rails 10, 10, the workpieces W on the carry-in station Si and processing stations $S_1$–$S_5$ are held stably at their comparatively wide portions by the handling arms 12a, 12b.

The cylinder 52 is then contracted to retire the roller 41 to a position on the side of the cam 42, and the main guide rails 10, 10 are moved up by the guide rail driving means 54.

When the driving carriages 19 are then moved forward in the workpiece-transferring direction 2 by the carriage driving means 18 to cause the arm carriages 11 to reach the substantially central portions of the first to fifth processing stations $S_1$–$S_5$ and carry-out station So, the main guide rails 10, 10 are lowered by the guide rail driving means 54. As a result, the workpieces W are transferred to the subsequent stations, i.e., the processing stations $S_1$–$S_5$ and carry-out station So.

When the workpieces W are placed on the lower molds $3_1$–$3_5$ on the processing stations $S_1$–$S_5$ and on the carry-out station So, the main guide rails 10, 10 are moved up by the guide rail driving means 54, and the cylinder 52 is extended. Consequently, the roller 41 engages with the second inclined surface portion 50 of the cam 42. The driving carriages 19 are then moved backwardly in the workpiece-transferring direction 2 by the carriage driving means 18.

In accordance with the backward movement of the driving carriages 19, the roller 41 rolls on the second inclined surface portion 50, and the shaft 37 is turned counterclockwise in FIG. 10. Accordingly, the rotary shaft 33 and driving pinion 34 cause the shaft 37 to be angularly displaced in the opposite direction, and the driving racks 26 are moved backwardly in the workpiece-transferring direction 2. Therefore, on each of the arm carriages 11, the handling arms 12a, 12b are moved toward each other. When the roller 41 has reached the substantially intermediate section of the horizontal surface portion 49, the arm carriages 11 are positioned between the carry-in station Si, first to fifth processing stations $S_1$–$S_5$ and the carry-out station So as shown in FIG. 3, and the handling arms 12a, 12b are brought to positions close to each other. This enables the space occupied by the handling arms 12a, 12b to be minimized.

Thus, the transfer of the workpieces W corresponding to one operation of the transfer system 9 is completed. The workpieces W are pressed in a stepped manner as they are transferred, by the alternate operations of the press 1 and transfer system 9.

According to this transfer system 9, the main guide rails 10, 10 are moved up and down by the guide rail driving means 54, and the arm carriages 11 are moved on the main guide rails 10, 10 by the carriage driving means 18. Namely, the vertical and horizontal part-transferring operations are carried out by these two types of driving means 54, 18. The amounts of power required by these driving means 54, 18 can be reduced to comparatively low levels, and the transfer system can thereby be miniaturized. Moreover, the handling arms 12a, 12b can hold a workpiece W stably at the comparatively wide portions thereof, and the space to be occupied by the handling arms during a waiting period can be minimized. Accordingly, the distance between the carry-in station Si, processing stations $S_1$–$S_5$ and carry-out station So can be reduced to a low level. This enables the transfer system as a whole to be miniaturized.

As described above, the first transfer system according to the present invention is provided with a pair of guide rails provided so as to extend along the workpiece-transferring direction and at both sides of the processing stations in such a manner that the guide rails can be moved up and down; a plurality of pairs of arm carriages, which are provided so that each pair are opposed to each other on both sides of the processing stations, and which can be moved on the guide rails; a plurality of handling arms which extend between the pairs of arm carriages each pair of which are opposed to each other with the processing stations therebetween, and which are capable of retaining the workpiece; connecting bars for joining the arm carriages on the same guide rail to one another; driving means for vertically moving the guide rails; and a driving means for reciprocating the arm carriages on the guide rails. Accordingly, the horizontal and vertical movements of the workpiece holding handling arms can be made separately by the carriage driving means and guide rail driving means. This enables the quantity of the power required by each of the driving means to be minimized, and the dimensions of the same driving means to be reduced greatly.

The second transfer system according to the present invention is provided in addition to the parts of the above-mentioned first transfer system with auxiliary guide rails fixed to the arm carriages so as to extend in parallel with the workpiece-transferring direction, the plurality of handling arms being disposed so that each of the workpiece processing stations has two handling arms, each of which is adapted to be moved forward and backward on the auxiliary guide rails prior to the transferring of the workpiece; driven racks fixed to both ends of the handling arms so that the driven racks extend in parallel with the workpiece-transferring direction; a pair of driving racks provided in opposition to the driven racks so that the driving racks extend through the arm carriages; and a selected number of pinions provided between the driving and driven racks so as to drive each pair of handling arms in the opposite directions, and supported rotatably on the arm carriages, the driving racks being connected to the rack driving means. Therefore, this transfer system has the following effect in addition to the effect of the first transfer system described above of the present invention. A workpiece can be held stably at the comparatively wide portions thereof. The space occupied by the handling bars during a waiting period can be minimized, so that the distance between the processing stations can be reduced. This contributes to the miniaturization of the transfer system as a whole.

It is readily apparent that the above-described Transfer System for Plastic Processing Machines meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A transfer system for plastic processing machines, which is used to transfer a workpiece to a plurality of processing stations in sequential order, each processing station having cooperating lower and upper molds, said stations being spaced in a workpiece-transferring direction for processing a workpiece transferred from station to station therethrough, said transfer system comprising a pair of guide rails extending parallel along the workpiece-transferring direction and at opposite sides of said processing stations, said guide rails being movable up and down; a plurality of pairs of arm carriages, each pair of carriages being opposed to each other on opposite sides of said processing stations and simultaneously movable on said guide rails in the workpiece-transferring direction; a pair of handling arms extending between each pair of arm carriages, said pair of handling arms being movable towards and away from each other in the workpiece transferring direction, said handling arms being capable of retaining said workpiece; said arm carriages on the same guide rail being joined to each other by connecting bars; driving means for vertically moving said guide rails; and driving means for reciprocating said arm carriages on said guide rails, said driving means for reciprocating said arm carriages including means for simultaneously moving said pair of arms away from each other when said carriages are moved in one direction and for moving said each pair of arms toward each other when said carriages are moved in the opposite direction.

2. A transfer system for plastic processing machines according to claim 1, wherein said arm carriage driving means include driving carriages at one end portion of said guide rails for moving said arm carriage in the forward direction and in the reverse direction with respect to the workpiece-transferring direction, and a driving mechanism for moving said driving carriages, said carriage driving means operatively connecting said arm carriages to said driving carriages.

3. A transfer system for plastic processing machines, which is used to transfer a workpiece to a plurality of processing stations in sequential order, said stations being provided so as to be spaced in a workpiece-transferring direction, comprising a pair of main guide rails extending parallel along the workpiece-transferring direction and with said processing stations therebetween, said guide rails being movable up and down; a plurality of pairs of arm carriages, each pair of being opposed to each other with said processing stations therebetween said simultaneously movable on said main guide rails, said each pair of arms being capable of retaining said work piece; auxiliary guide rails affixed to each arm carriage and extending in parallel with the workpiece-transferring direction; a pair of handling arms extending between each pair of arm carriages, said each pair of handling arms being movable in an opposite direction on said auxiliary guide rails; connecting bars joining said arm carriages on the same main guide rail to one another; each handling arm having a driven rack at opposite ends adjacent said auxiliary guide rails so that said driven rack extends parallel with the workpiece-transferring direction; a pair of driving racks, one on each side parallel to the main guide rail, for driving all the driven racks and therefore simultaneously driving all pairs of handling arms; a selected number of pinions supported rotatably on each arm carriage at said opposite ends and provided between said driving and driven racks for driving one of said arms of each pair of handling arms in the direction opposite to the direction of drive of the other arm of said pair of handling arms; driving means for vertically moving said main guide rails; driving means for reciprocating said arm carriages on said main guide rails; and rack driving means connected to said driving racks so as to reciprocate said driving racks in the workpiece-transfer direction.

4. A transfer system for plastic processing machines according to claim 3, wherein said arm carriage driving means is provided with driving carriages at one end of said main guide rails with respect to the workpiece-transferring direction, and a driving mechanism for moving said driving carriages, said arm carriage driving means operatively connecting said arm carriages to said driving carriages, said rack driving means being provided on said driving carriages.

* * * * *